March 27, 1934.  P. ZIELINSKI  1,952,700

COMBINED BABY BUGGY AND CRADLE

Filed Dec. 30, 1931  2 Sheets-Sheet 1

Inventor:
Peter Zielinski
By Brayton Richards
Att'y

March 27, 1934.   P. ZIELINSKI   1,952,700
COMBINED BABY BUGGY AND CRADLE
Filed Dec. 30, 1931   2 Sheets-Sheet 2
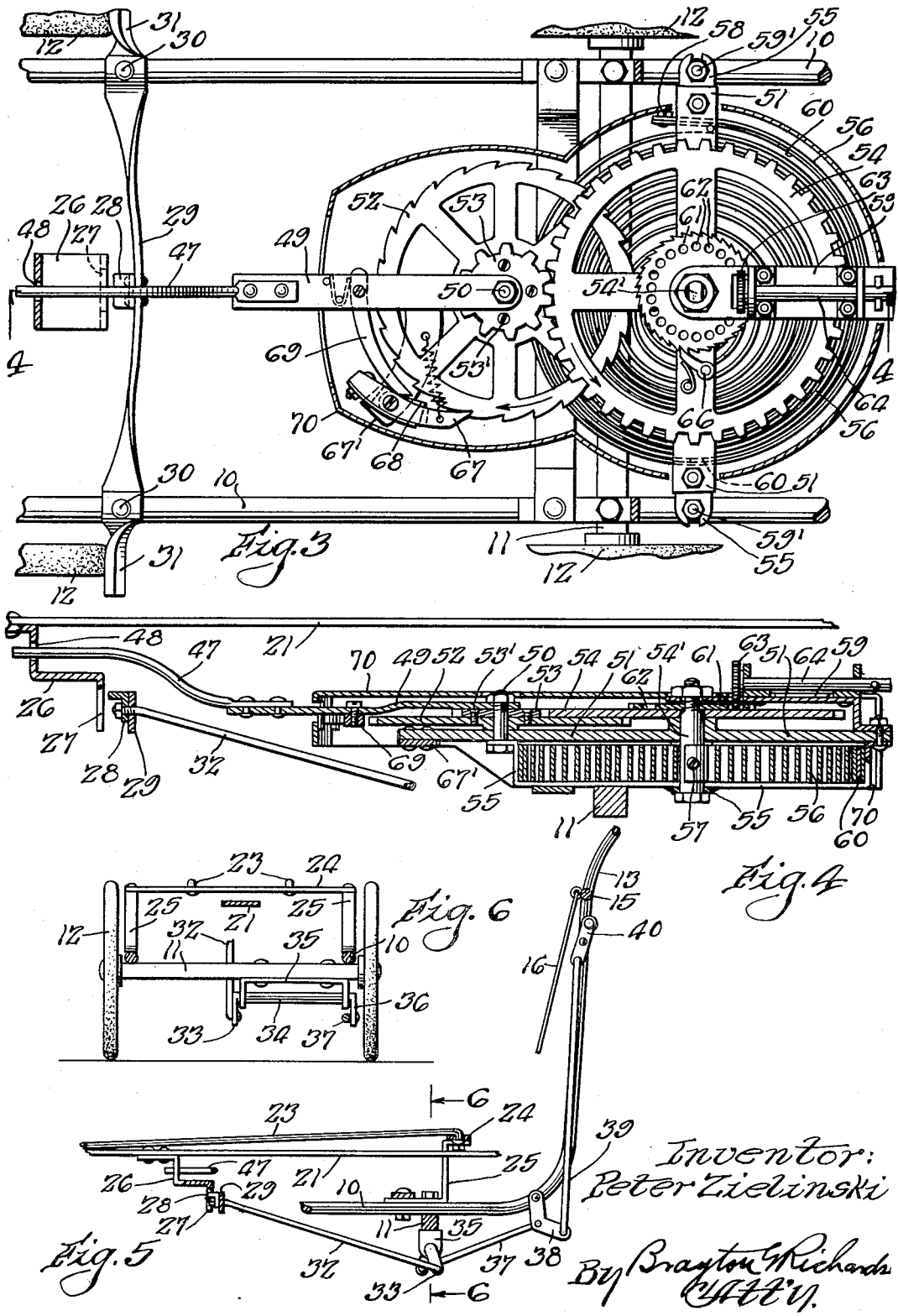

Patented Mar. 27, 1934

1,952,700

UNITED STATES PATENT OFFICE 1,952,700

COMBINED BABY BUGGY AND CRADLE

Peter Zielinski, Chicago, Ill., assignor of forty per cent to Mike Czech, Chicago, Ill.

Application December 30, 1931, Serial No. 583,927

9 Claims. (Cl. 280—31)

The invention relates to a combined baby buggy and cradle and has for its primary object the provision of a simple and efficient construction of the character indicated which may be readily used either as a baby buggy or a cradle.

Another object of the invention is the provision of an improved construction of the character indicated, provided with means for rocking or oscillating the same when used as a cradle.

Another object of the invention is the provision of a construction of the character indicated so constructed and arranged as to be quickly converted from a baby buggy into a cradle and vice versa.

Another object of the invention is the provision of a construction of the character indicated so arranged that the conversion of the baby buggy into a cradle automatically starts the mechanism for rocking the cradle and vice versa.

Other objects will appear hereinafter.

The invention consists in the combinations and arrangements of parts hereinafter described and claimed.

Figure 1:
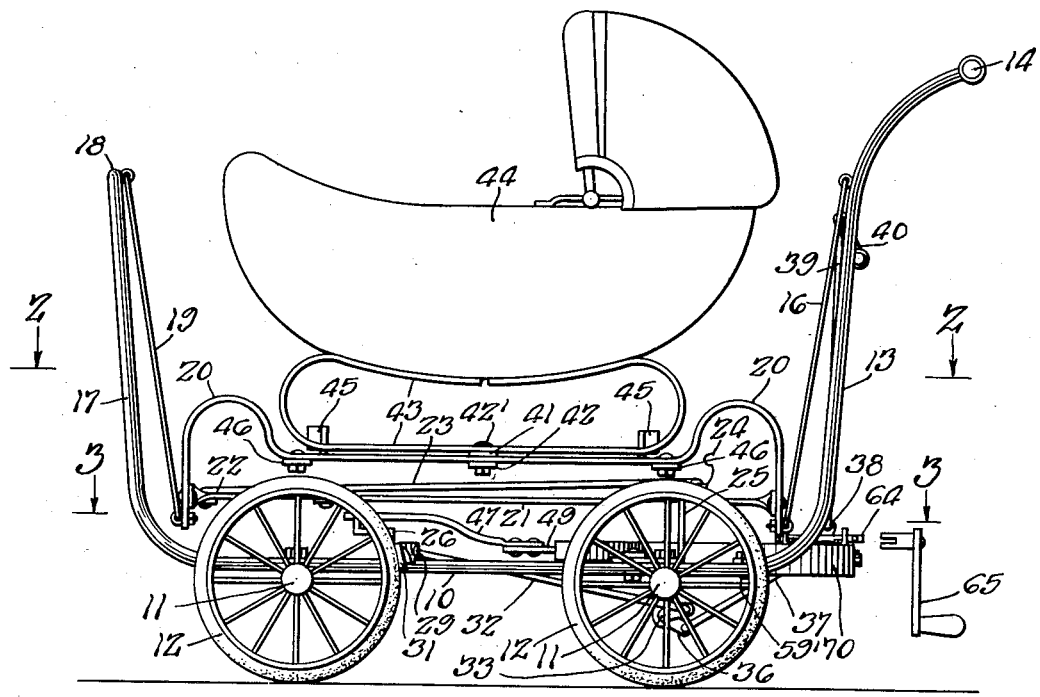
Figure 2:
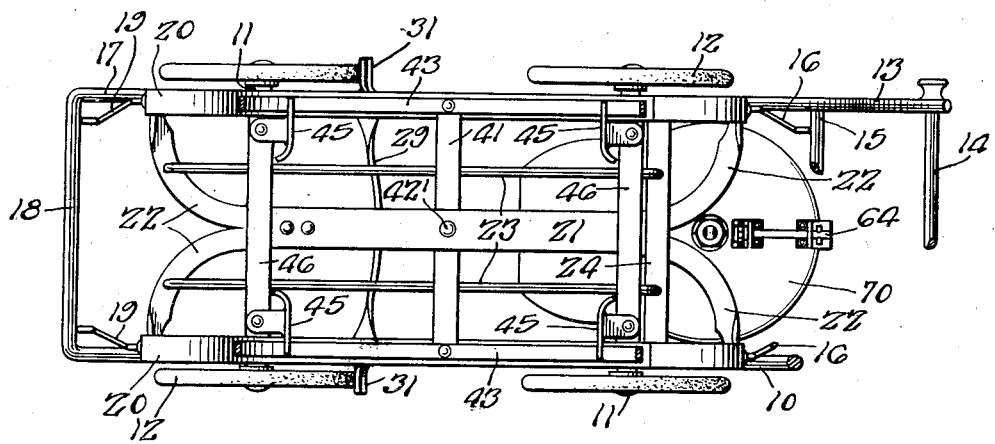

The invention will be best understood by reference to the accompanying drawings forming a part of the specification, and in which Fig. 1 is a side view of a construction embodying the invention;

Fig. 2, a horizontal section of the same taken substantially on line 2—2 of Fig. 1;

Fig. 3, an enlarged partial horizontal section taken substantially on line 3—3 of Fig. 1;

Fig. 4, a section taken substantially on line 4—4 of Fig. 3;

Fig. 5, a partial detail section taken through the rear portion of the construction; and Fig. 6, a section taken substantially on line 6—6 of Fig. 5.

The embodiment of the invention illustrated in the drawings comprises a main frame having side bars 10 mounted upon suitable axles 11 equipped with suitable wheels 12 so as to constitute a main frame for the construction. At the rear, the side bars 10 are bent upwardly and rearwardly to constitute a handle frame 13 terminating at its upper end in a suitable handle 14 for manipulating the construction as a baby buggy. A cross-bar 15 is arranged between the upper portions of the handle members 13 and two suspending links 16 are supported by suitable screw eyes as shown on the bar 15 so as to be capable of swinging freely in any direction.

At the front, the side bars 10 are similarly extended upwardly to form a supporting frame 17 terminating at its upper end in a supporting bar 18 to which are attached two swinging links 19 similar in all respects to the links 16.

A supporting frame is mounted on the links 16 and 19, said supporting frame comprising spring side bars 20 and a central, longitudinal bar 21 having divergent arms 22 at its opposite ends secured as shown to the ends of the spring side bars 20, thereby forming a spring supporting frame swinging freely on the links 16 and 19. Two parallel controlling links 23 are pivoted at their forward ends to the forward arms 22 and at their rearward ends to a cross-bar 24 mounted on standards 25 secured to the side bars 10 of the main frame, as best shown in Figs. 2 and 5. By this arrangement, the swinging of the supporting frame is controlled so as to prevent longitudinal swinging thereof but to permit of free lateral swinging or rocking of the suspending links 16 and 19.

Arranged on the underside of the longitudinal bar 21 of the supporting frame is an angular bracket 26, best shown in Fig. 4. The lower end of the bracket 26 is provided with a locking notch 27 adapted to engage a locking lug 28 secured to the forward side of a transverse, flexible combined locking and braking bar 29 pivoted at the points 30 to the side bars 10 of the main frame. The protruding ends 31 of the bar 29 are formed and shaped to constitute brake shoes to contact with the peripheries of the front wheels 12 of the main frame. The arrangement is such that when the bar 29 is flexed rearwardly, as shown in Fig. 3, the locking lug 28 will be withdrawn from the notch 27 thereby freeing the supporting frame for lateral swinging or rocking and at the same time the brake shoes 31 will be applied to the wheels 12 with sufficient force to lock said wheels against rolling or revolving so as to prevent movement of the construction when the same is to be used as a cradle.

As best shown in Figs. 5 and 6, an operating rod 32 is secured centrally to the bar 29 extending thence rearwardly and downwardly to connect with a rocker arm 33 on a rocker shaft 34 mounted in a bracket 35 on the underside of the rear axle 11. The rocker shaft 34 also carries another rocker arm 36 connected by a link 37 with an angular lever 38 fulcrumed on the corresponding side bar 10 and connected by a link 39 with the operating handle 40 whereby, when said operating handle 40 is swung upwardly into the position indicated in Fig. 5, the locking lug 28 will be withdrawn from the notch 27, thereby freeing the supporting frame for lateral rocking and at the same time automatically applying the brake shoes 31 to the front wheels 12.

As best shown in Figs. 1 and 2, a cross-bar 41 is pivotally connected at 42' on a central cross-bar 42 on the supporting frame. At its opposite ends the cross-bar 41 carries support springs 43 on which a baby buggy body 44 of any suitable or desired construction is mounted, as indicated in Fig. 1. Locking detents 45 are pivotally mounted on cross-bars 46 of the supporting frame in positions to swing over the springs 43 and lock said baby buggy from lateral swinging on pivot 42'. By this arrangement, the position of the body 44 may be adjusted as desired when the construction is used as a cradle or locked against said movement when the construction is to be used as a baby buggy.

As best shown in Figs. 1, 3 and 4, a rocker arm 47 is arranged to slide freely through an opening 48 in the bracket 26 extending thence rearwardly and downwardly to connect with a rocker bar 49 mounted to oscillate freely on a stud bolt 50 attached to a rigid frame supporting arm 51. A ratchet wheel 52 is loosely mounted on the stud bolt 50 and carries a pinion 53 rigidly secured to the ratchet 52 by means of screws 53'. The pinion 53 meshes with a gear 54 rigidly mounted on the squared end of a clock spring shaft 54'. The shaft 54' is mounted in a suitable supporting bracket 55 secured, as shown, to the underside of the frame of the arm 51, as indicated. A clock spring 56 is arranged as indicated within the bracket 55 having one end secured by screw 57 to the shaft 54'. The other end of the clock spring 56 carries a stop bolt 58 arranged to engage the supporting frame work 59 which is secured by screws 59' to the side bars 10 of the main frame. A reinforcing strip or plate 60 is secured to the inner side of the end of spring 56 by means of the bolt 58 extending thence substantially one-quarter of a turn or coil of said spring, the end of strip 60 being otherwise free from the spring 56. The strip 60 serves as a guard or stiffening member and serves to hold the end of the spring in correct circular form. A ratchet wheel 61 fits snugly over the squared end of the shaft 54' and is provided with gear teeth openings 62 intermeshing with the teeth of a gear 63 on a winding shaft 64 co-operating with a winding handle 65, shown in Fig. 1, to permit of the winding of the clock spring 56, as will be readily understood.

A spring-held pawl 66 mounted on gear 54 co-operates with the ratchet 61 to permit of the winding of the spring 56 and the placing of the gear 54 under the tension of said spring when wound so that the tendency of the spring 56 will be to rotate the gear 54 and through it the gear 53 and ratchet 52, as will be readily understood, said mechanism constituting a form of clock spring mechanism for operating the ratchet 52.

A spring-held pawl 67 is mounted on a rigid arm 67' of the plate 51 to engage the ratchet 52 and normally prevent rotation of said ratchet. The pawl 67 carries a cam block 68 co-operating with the end of another spring-held pawl 69 mounted on the underside of the rocker arm 49, the arrangement being such that when the pawl 69 is forced in between the pawl 67 and the periphery of the ratchet 52, the pawl 67 will be forced outwardly, to release the ratchet 52 for a partial rotation under the influence of the spring 56, as will be readily understood. At the time the pawl 67 is released from the ratchet 52, the pawl 69 is in position to engage the next tooth of said ratchet so as to lock the arm 49 to the ratchet 52. The influence of the spring will then rock the arm 49 backwardly, thereby withdrawing the pawl 69 and causing the pawl 67 to re-engage the ratchet after a peripheral movement equal to the length of one of the ratchet teeth. As has been previously indicated, the arm 49 is in operative connection with the bracket 26 on the underside of the supporting frame so that this backward swing of the arm 49 imparts a corresponding backward oscillatory impulse to the supporting frame to keep the same swinging or oscillating.

Thus, when the stop lug 28 is withdrawn from the bracket 26 to release the supporting frame as explained above, and the buggy body 44 is given a preliminary swing to start the operation of the pawl 69, as explained above, the tension of the spring 56 will automatically continue such oscillation of rocking of the buggy body until the tension of the spring is practically exhausted. Thus, when the handle 40 is manipulated to convert the construction into a cradle, the buggy body 44 is automatically released for oscillating or rocking movement. Then by giving the buggy body a slight preliminary oscillation, the oscillation or rocking thereof will be continued until the tension of the spring 56 has been exhausted. A suitable casing or housing 70 is placed over the clock spring mechanism so as to prevent injury to the fingers of the children and exclude dust and dirt therefrom.

By means of the arrangement set forth, a simple and effective construction is provided which will serve either as a baby buggy or as a baby cradle and the act of converting the construction from a baby buggy into a cradle will release the buggy body for lateral oscillating or rocking motion to induce sleep or contentment in the mind of the baby. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

I claim:

1. The combination of a wheeled frame; a baby supporting body mounted to oscillate laterally on said frame; means for locking said body against oscillating and the frame wheels from revolving; and selective means for simultaneously unlocking said body and locking said wheels or locking said body and unlocking said wheels.

2. The combination of a wheeled frame; a baby supporting body mounted to oscillate laterally on said frame; means for locking said body against oscillating and the frame wheels from revolving; selective means for simultaneously unlocking said body and locking said wheels or locking said body and unlocking said wheels; and a clock spring mechanism for oscillating said body.

3. The combination of a wheeled frame; a baby supporting body mounted to oscillate laterally on said frame; a transverse spring bar on said frame having brake ends arranged to engage two of the wheels and its central portion carrying a locking detent; a locking element connected with said body and engaging said detent to prevent oscillating of the body; and means for flexing said bar to apply said brake ends and free said body for oscillating.

4. The combination of a wheeled main frame; a supporting frame mounted to oscillate laterally on said main frame; a spring frame on said supporting frame; a baby supporting body on said spring frame; a transverse spring bar on said main frame having brake ends arranged to engage two of the wheels and its central portion carrying a locking detent; a locking element on said supporting frame engaging said detent to prevent oscillating of said supporting frame; and means for flexing said bar to apply said brake ends and free said supporting frame for oscillating.

5. The combination of a wheeled frame; a baby supporting body mounted to oscillate laterally on said frame; a transverse spring bar on said frame having brake ends arranged to engage two of the wheels and its central portion carrying a locking detent; a locking element connected with said body and engaging said detent to prevent oscillating of the body; means for flexing said bar to apply said brake ends and free said body for oscillating; and a clock spring mechanism for oscillating said body when freed.

6. The combination of a wheeled main frame; a supporting frame mounted to oscillate laterally on said main frame; a spring frame on said supporting frame; a baby supporting body on said spring frame; a transverse spring bar on said main frame having brake ends arranged to engage two of the wheels and its central portion carrying a locking detent; a locking element on said supporting frame engaging said detent to prevent oscillating of said supporting frame; means for flexing said bar to apply said brake ends and free said supporting frame for oscillating; and a clock spring mechanism for oscillating said supporting frame when freed.

7. The combination of a wheeled frame; an upwardly and rearwardly extending combined handle and suspending frame at the rear of said wheeled frame; an upwardly and forwardly extending suspending frame at the front end of said wheeled frame; depending links on said combined suspending and handle frame and on said suspending frame; a supporting frame suspended on said links; means for locking said supporting frame against longitudinal, but permitting free lateral oscillating thereof; a spring frame on said supporting frame; a baby supporting body on said spring frame; a transverse spring bar on said wheeled frame having brake ends arranged to engage two of the wheels and its central portion carrying a locking detent, a locking element on said supporting frame engaging said detent to prevent lateral oscillating of said supporting frame; and means for flexing said bar to apply said brake ends and free said supporting frame for lateral oscillating.

8. The combination of a wheeled frame; an upwardly and rearwardly extending combined handle and suspending frame at the rear of said wheeled frame; an upwardly and forwardly extending suspending frame at the front end of said wheeled frame; depending links on said combined suspending and handle frame and on said suspending frame; a supporting frame suspended on said links; means for locking said supporting frame against longitudinal, but permitting free lateral oscillating thereof; a spring frame on said supporting frame; a baby supporting body on said spring frame; a transverse spring bar on said wheeled frame having brake ends arranged to engage two of the wheels and its central portion carrying a locking detent; a locking element on said supporting frame engaging said detent to prevent lateral oscillating of said supporting frame; means for flexing said bar to apply said brake ends and free said supporting frame for lateral oscillating; and a clock spring mechanism for oscillating said supporting frame when freed.

9. The combination of a wheeled frame; a baby supporting body mounted to oscillate laterally on said frame; means for locking said body against oscillating; a brake applicable to wheels of said frame; and selective means for simultaneously releasing said locking means and applying said brake or for locking said body and releasing said brake.

PETER ZIELINSKI.